(12) United States Patent
Fulczyk et al.

(10) Patent No.: US 6,904,372 B2
(45) Date of Patent: Jun. 7, 2005

(54) METHOD OF THE IDENTIFICATION OF WEAK AND/OR STRONG NODES OF AN ELECTRIC POWER SYSTEM

(75) Inventors: Marek Fulczyk, K.dzierzyn-Ko-le (PL); Marian Sobierajski, Wroc.aw (PL); Joachim Bertsch, Kilchberg (CH)

(73) Assignee: ABB Technology AG, Zurich (CH)

( * ) Notice: Subject to any disclaimer, the term of this patent is extended or adjusted under 35 U.S.C. 154(b) by 88 days.

(21) Appl. No.: 10/322,585

(22) Filed: Dec. 19, 2002

(65) Prior Publication Data

US 2003/0139887 A1 Jul. 24, 2003

(30) Foreign Application Priority Data

Dec. 20, 2001 (PL) .................................................. 351292

(51) Int. Cl.[7] .............................................. G01R 21/00
(52) U.S. Cl. .......................... 702/58; 702/59; 702/60; 702/64; 702/65
(58) Field of Search .............................. 702/57–62, 64, 702/65, 124, 126, 183, 185, 188, 189, 193, 198; 700/22, 26, 27, 286, 291, 293; 307/125, 126, 130, 29, 31, 38, 39, 102; 324/600, 602, 605, 103 R, 141, 142; 340/870.01, 870.02

(56) References Cited

U.S. PATENT DOCUMENTS

| 5,745,368 A | 4/1998 | Ejebe et al. ................. 702/164 |
| 5,796,628 A | 8/1998 | Chiang et al. ............... 700/295 |

FOREIGN PATENT DOCUMENTS

EP 1134867 9/2001

OTHER PUBLICATIONS

Dehnel et al., "A method for identifying weak nodes in nonconvergent load flows", May 1989, IEEE, IEEE Transactions on Power Systems, vol. 4, issue 2, pp. 801–807.*

Yorino et al., "A method to approximate a closest loadability limit using multiple load flow solutions", Feb. 1997, IEEE, IEEE Transactions on Power Systems, vol. 12, issue 1, pp. 424–429.*

Chen et al., "Efficient methods for identifying weak nodes in electrical power networks", May 1995, IEEE, IEEE Proceedings—Generation, Transmission and Distribution, vol. 142, issue 3, pp. 317–322.*

* cited by examiner

*Primary Examiner*—Hal Wachsman
(74) *Attorney, Agent, or Firm*—Burns, Doane, Swecker & Mathis, L.L.P.

(57) ABSTRACT

A method is disclosed for the identification of weak and/or strong nodes of an electric power transmission system. Electric parameters characterizing nodes and branches of an electric power transmission system are subject to computational treatment to obtain equations of power flow in all nodes of the system at assumed 100 percent system load value. Using earth as the reference point, nodal impedance values are computed for all nodes, and used to construct a P-Q curve which presents the functional relation between the system's reactive and active load. The nodal coefficient of voltage stability is determined as the relative distance between the base load point of that node and the critical point on the P-Q curve situated most closely to the base point. The coefficient is compared with a threshold value considered to be a safe margin to maintain voltage stability for a given node.

3 Claims, 2 Drawing Sheets

METHOD OF THE IDENTIFICATION OF WEAK AND/OR STRONG NODES OF AN ELECTRIC POWER SYSTEM

FIELD OF THE INVENTION

The subject of the invention is a method for the identification of weak and/or strong nodes of an electric power transmission system comprising at least one generator and nodes, interconnected by transmission lines, useful especially for the determination of the weak nodes of the analysed system. The method for the determination of the weak nodes of a power system employs known methods of determining the voltage stability of the whole system and predicts the voltage stability margin in specific nodes of the power system.

BACKGROUND OF THE INVENTION

From U.S. patent description Ser. No. 5,745,368 there is known a method of voltage stability analysis in electric power systems. That description discloses a method which is appropriate for low and high voltage applications as well as differing types of loads and load variations. In that method, a nose point of a P-Q curve showing functional relation between voltage and power is found, from which the distances to points characterizing the reactive, active and apparent power are calculated, while a generalised curve fit is used to compute the equivalent or surrogate nose point. The determination of that point is achieved by approximating a stable branch and creating a voltage versus power curve, determining a plurality of stable equilibrium points on the voltage and load curve, using the plurality of determined stable equilibrium points to create and fit an approximate stable branch, calculating an approximate voltage collapse point and thereafter a voltage collapse index. The value of that index allows for predicting the occurrence of expected voltage collapse under specific conditions.

From a European patent application No. EP 1 134 867 there is known a method for the assessment of stability of electric power transmission networks. The method comprises the measurement of vector quantities for voltage and current in numerous points in the network, transfer of those data to the system protection centre, transfer of information regarding the operating condition of equipment in the substations of that network, and, on the basis of the acquired data, determination of at least one stability margin value of the transmission network. The measured vectors may be represented by quantities such as voltage, current, power, or energy connected with phase conductor or an electronic system.

The method for the identification of weak and/or strong nodes of an electric power system according to the invention can be possibly employed as a useful solution for the assessment of stability of power networks, for example, in the solution presented in the application EP 1 134 867, although the identification of weak nodes in networks can be made separately from the methods of network stability assessment as presented in the state of the art, and the method as such is not yet known.

On the other hand, from U.S. patent description Ser. No. 5,796,628 there is known a dynamic method for preventing voltage collapse in electric power systems. In the presented solution "weak areas" in networks are identified. These areas are defined as those parts of the network which do not withstand additional load. The solution introduced in that description consists in monitoring the power network through the surveillance of real-time data from the network, forecasting the near-term load of each branch of the network as well as the power demand in that branch on the basis of those data, and in order to estimate the system stability, such that each of the branches would be able to withstand the expected load, the amount of the margin of reactive and/or active load is defined. The proposed value of this load as well as the proposed voltage profiles are determined on the basis of the known power flow technique and the saddle-node bifurcation theory.

SUMMARY OF THE INVENTION

The method for the identification of weak and/or strong nodes of an electric power transmission system according to the invention, which employs known computational methods regarding power flow in the nodes and branches of an electric power transmission system, and in which functional relations between active and reactive loads for that system are analysed, consists in subjecting the characteristic electric parameters of nodes and branches of the power system to computational treatment to achieve power flow equations for all that system's nodes with assumed 100 percent system load value, which treatment is used to calculate the complex voltage values in those nodes. Then the ground is assumed as the reference node and the values of node impedance for all nodes of the system are calculated, which values are then used to construct the P-Q curve which shows functional relation between reactive and active load of the system. Individually for each node, in the next step, the nodal voltage stability coefficient is determined as the relative distance between the base load point of this node and the critical point on the P-Q curve most closely situated to that base point, and then the numerical value of this coefficient is compared to the threshold value considered to be a safe margin for maintaining voltage stability for the given node. The result of this comparison allows to identify the analysed node as weak or strong.

Preferably the nodal voltage stability coefficient is calculated from this relation:

$$k_{cr} = \frac{\sqrt{(p_{cr}-p_b)^2 + (q_{cr}-q_b)^2}}{\sqrt{(p_{cr})^2 + (q_{cr})^2}},$$

where: $p_{cr}$—is the values of the coordinates of active load in the node during critical operating conditions at the voltage stability limit,
$q_{cr}$—is the values of the coordinates of reactive load in the node during critical operating conditions at the voltage stability limit,
$P_b$—is the values of the coordinates of the base point of active load in the analysed node,
a $q_b$—is the values of the coordinates of the base point of reactive load in the analysed node.

Preferably the analysed node is considered to be weak where the value of the nodal voltage stability coefficient is less than or equal to 0.8 or strong where the value of the nodal voltage stability coefficient is bigger than 0.8.

The advantage of the method according to the invention is the ability to determine the weak and/or strong nodes of an electric power transmission system without the need for making a multivariant analysis of power flow in the power system considering the critical loads and cutouts of individual system elements.

BRIEF DESCRIPTION OF THE DRAWINGS

The method according to the invention will be presented more closely by its embodiment and a drawing, where.

DETAILED DESCRIPTION OF THE INVENTION

Figure 1:
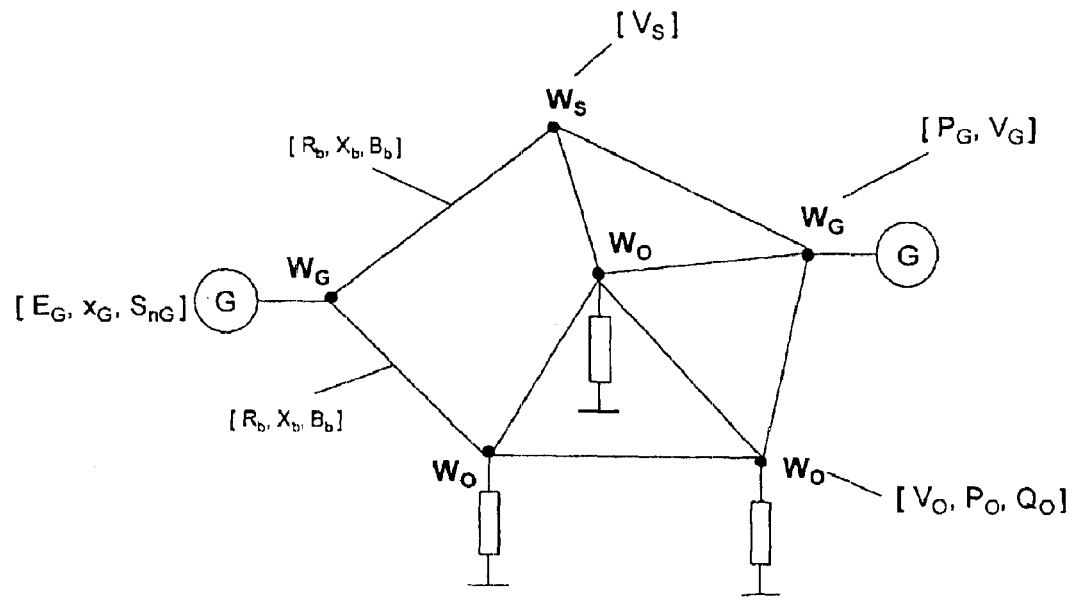
FIG. 1 shows the schematic diagram of the power system structure, FIG. 2-schematic diagram of the power system structure with altered reference node, FIG. 3-exemplary diagram showing the relation between active load P and reactive load Q for a receiver node with marked base load point and a critical point, and FIG. 4-a set of operations necessary to realise this method.

In a schematic presentation in FIG. 1 the electric power transmission system is a network formed by feed generators G connected with generator nodes $W_G$ which in turn are connected to at least one receiver node $W_O$ by means of appropriate transmission lines. At least one of the generator nodes $W_G$ is connected through a transmission line with a flow node $W_S$, which in turn is connected to at least one receiver node $W_O$. Further on in the description, all transmission lines are called system branches.

For the network system formed as shown above, in the first stage of the realisation of the method, electric parameters in the system's nodes and in its branches are measured. In generator G voltage $E_G$ is measured. In generator nodes $W_G$ voltage $V_G$ and active load $P_G$ are measured. In receiver nodes $W_O$ voltage $V_O$, active load $P_O$ and reactive load $Q_O$ are measured. In flow node $W_S$ voltage $V_S$ is measured. In branches connecting the analysed generator nodes $W_G$ with the flow node $W_S$ and with receiver nodes $W_O$ resistance $R_b$, reactance $X_b$ and susceptance $B_b$ are measured.

Measurement data are fed to the control device, not shown in the drawing, which is a computer provided with suitable software, where the data are stored in its memory in a suitable digital form.

Measurement data recorded in the control device are made complete when the device reads-in the sychronous reactance $X_G$ of generator G and its apparent power $S_{nG}$. Operations regarding data preparation are shown in FIG. 4 as block 1.

When all the necessary data have been collected, the control device computes the equations of power flow in all nodes $W_G$, $W_O$, and in node $W_S$ of the system, using known mathematical methods suitable for such purposes, such as, for instance, the Newton's method. For the computation, 100% total system load is assumed. The result of the conducted calculations concerning power flow are complex values of voltages in all nodes of the system.

Figure 4:
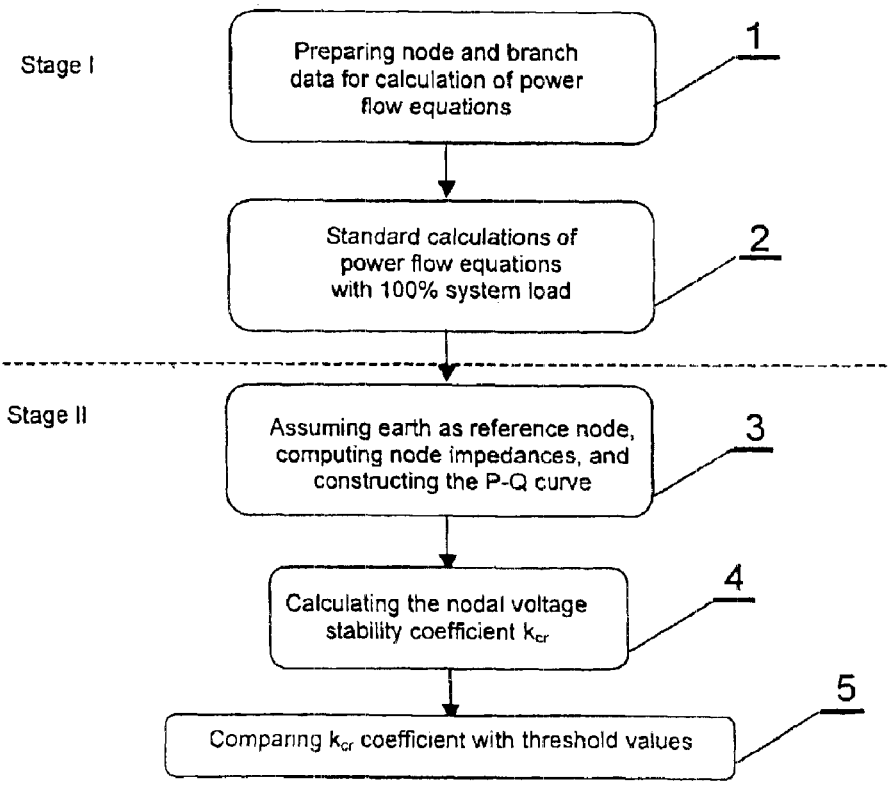

The computing operations concerning the standard calculation of power flow, with a 100% system load, are shown in FIG. 4 as block 2.

Figure 2:
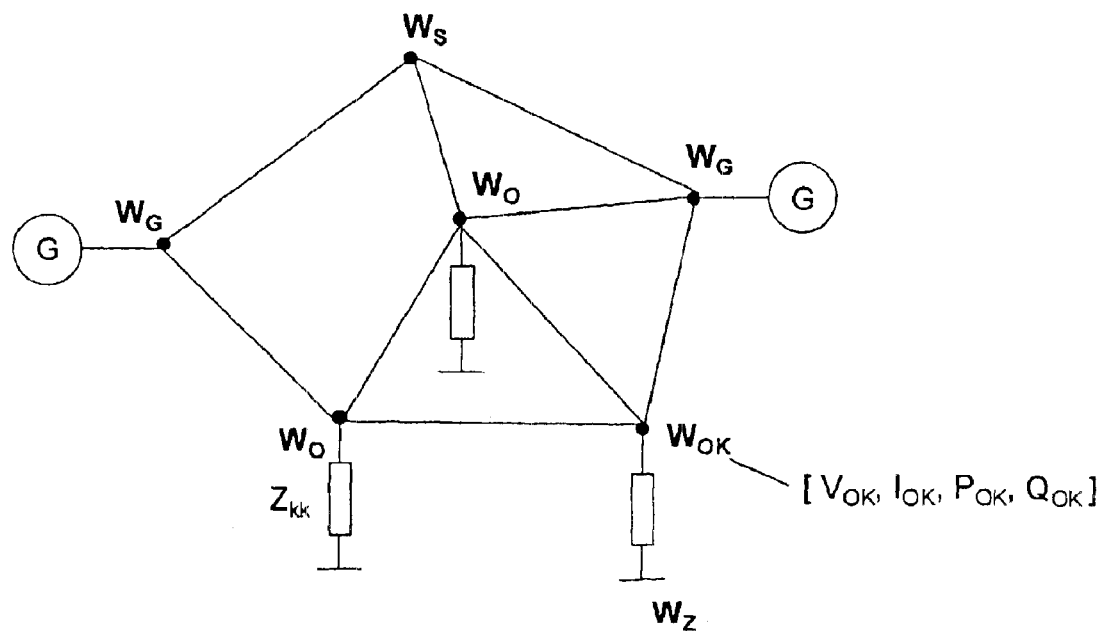

Then, in stage two, /FIG.2/ the earth is assumed as a reference node $W_Z$ with respect to which further actions are carried out. These actions consist in modelling the node load in the form of its node admittance and determining the Kirchoff's and Ohm's equations matrix comprising the determined synchronous reactances $x_G$ of generator G and the complex voltage values determined earlier for 100% load.

$$\begin{bmatrix} E_G \frac{1}{x_G} \\ 0 \end{bmatrix} = Y_n \begin{bmatrix} V_G \\ V_O \end{bmatrix},$$

where $Y_n$ is the node admittance matrix.

In the next step, node impedance matrix $Z_n$ is determined as the inverse of matrix $Y_n$ and after transformation the following matrix equation is obtained:

$$\begin{bmatrix} V_G \\ V_O \end{bmatrix} = Z_n \begin{bmatrix} E_G \frac{1}{x_G} \\ 0 \end{bmatrix}.$$

From the above matrix equation the equation describing operating conditions for the $k^{th}$ receiver node is determined as:

$$V_{Ok} = Z_{k1}E_{G1} + \ldots + Z_{ki}E_{Gi} + \ldots + Z_{kk}0_{Ok} + \ldots + Z_{kn}0_{On}. \quad /1/$$

Then a small variation in active load $\Delta P$ and reactive load $\Delta Q$ in the examined receiver node $W_O$ is assumed, which variation produces small current increases $\Delta I_O$ and voltage increases $\Delta V_O$ in this node. This variation is modelled by connecting additional impedance $Z_{aOk}$ in the $k^{th}$ receiver node $W_O$. For changed load conditions the equation /1/ will have the following form:

$$V_{Ok} + \Delta V_{Ok} = Z_{k1}E_{G1} + \ldots + Z_{ki}E_{Gi} + \ldots + Z_{kk}\Delta I_{Ok} + \ldots + Z_{kn}0_{On} \quad /2/.$$

Hence, having transformed the equations /1/ and /2/ we receive an equation defining the value of node impedance in the $k^{th}$ receiver node, which has this form:

$$Z_{kk} = \Delta V_{OK}/\Delta I_{OK} \quad /3/,$$

where $\Delta V_{OK}$-is voltage increment in the $k^{th}$ node accompanying a load change, $\Delta I_{OK}$-is current increment in the $k^{th}$ node accompanying a load change.

It follows from the equation /3/ that having measured the values of voltages and currents in the $k^{th}$ receiver node before and after voltage variation one can determine the values of node impedance $Z_{kk}$.

In the next step of the procedure, all operations performed following the change of the reference node shall be repeated, for all generator nodes $W_G$ of the system, the estimated node impedance being the synchronous impedance $Z_{Gi}$ of generator G, which is:

$$Z_{Gi} = \Delta V_{Gi}/\Delta I_{Gi} \quad /4/,$$

where $\Delta V_{Gi}$-is the voltage increment in the $i^{th}$ generator node accompanying load change, $\Delta I_{Gi}$-is the current increment in the $i_{th}$ generator node accompanying load change.

Knowing the values of node impedances $Z_{kk}$, generator synchronous impedances $Z_{Gi}$, voltage in receiver nodes $V_{Ok}$, current in receiver nodes $I_{Ok}$ and generator voltage $E_{Ok}$, the power flow equation can be presented in the following complex form:

$$\underline{S}_{Ok} = \left(\frac{1}{\underline{Z}_{kk}}\right)^* V_{Ok}^2 + \left(\frac{-1}{\underline{Z}_{kk}}\right)^* \underline{E}_{Tk}^* \underline{V}, \quad /5/$$

where:

$$\underline{E}_{Tk} = V_{Ok} + V_{Ok}\underline{Z}_{kk} \quad /6/,$$

which, following a number of transformations, can be written in the form of this equation:

$$(-xp+rq)^2 - rp - xq - 0.25 = 0 \qquad /7/,$$

where: "p" and "q" are the variables of this equation, and "x" and "r" are coefficients defining the shape of the curve P-Q.

Figure 3:
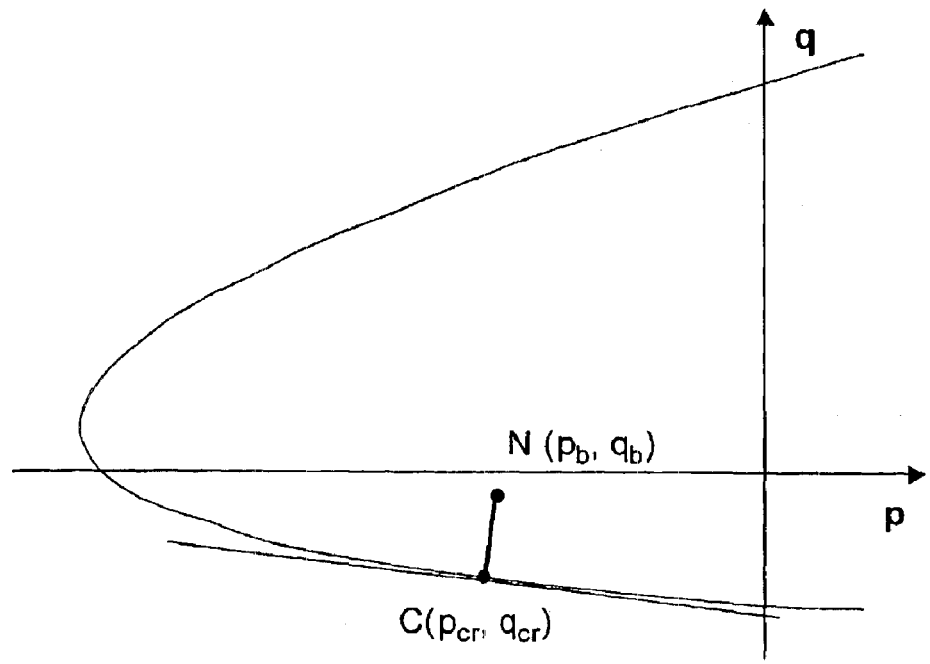

Equation /7/ presents the curve P-Q as a functional relation between active load P and reactive load Q in a given, analysed receiver node, in a cartesian coordinate system, as in FIG. 3.

The above mentioned operations, consisting in assuming the earth as the reference node, and computing node impedances both for receiver nodes and generator nodes, and plotting the curve P-Q are marked in FIG. 4 as block 3.

Next, for base load point N, indicated in the coordinate system with the curve P-Q, defined by coordinates $(p_b, q_b)$, which characterizes the base load of the node, we determine the minimum distance between this point and critical point C of coordinates $(p_{cr}, q_{cr})$ situated on the previously plotted curve P-Q.

The operation of determining the load point is marked in FIG. 4 as block 4.

In the next step, on the basis of the reciprocal positions of point N, which reflects the base load defined by coordinates $(p_b, q_b)$, point C of coordinates $(p_{cr}, q_{cr})$ situated on curve P-Q, positioned at a minimum distance from point N, and the point defining the beginning of the coordinate system in which the curve P-Q has been plotted, the nodal coefficient of voltage stability $k_{cr}$ is determined as the relative distance between points N and C and its value is calculated from this equation:

$$k_{cr} = \frac{\sqrt{(p_{cr} - p_b)^2 + (q_{cr} - q_b)^2}}{\sqrt{(q_{cr})^2 + (q_{cr})^2}}, \qquad /8/$$

where: $p_{cr}$—is the values of coordinates of active load in the node during critical operating conditions at the voltage stability limit, $q_{cr}$—is the values of coordinates of reactive load in the node during critical operating conditions at the voltage stability limit, $p_b$—is the values of coordinates of active load base point in the analysed node, a $q_b$—are the values of coordinates of reactive load base point in the analysed node.

Calculation of the nodal coefficient of voltage stability is indicated as block 5 in FIG. 4.

In the next step, presented in FIG. 4 as block 6, identification of the system's nodes is made by comparing the numerical value of the $k_{cr}$ coefficient determined for the given node with the assumed threshold value equal to 0.8, which value assumes a 20% allowance as a safety margin to maintain the node voltage stability. The result of the comparison serves to determine whether the analysed node is weak, for instance, when the value $k_{cr} \leq 0.8$, or if the node is strong, when $k_{cr} > 0.8$.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for the identification of weak and/or strong nodes of an electric power transmission system, which analyzes functional relations between an active and a reactive load for the system, comprising:

subjecting electric parameters characterizing the nodes and branches of the system to computational treatment in order to obtain power flow equations in all nodes of the system at assumed 100 percent system load, using the treatment to calculate complex voltage values in the nodes, using earth as a reference node, calculating node impedance values for all the system's nodes, using the node impedance values to construct a curve /P-Q/ showing a functional relation between reactive load /Q/ and active load /P/ of the system, and for a given each node, individually determining a nodal coefficient of voltage stability as a relative distance between a base load point of the given node and a critical point on the curve /P-Q/ which is situated most closely to the base load point, whereupon a numerical value of the nodal coefficient is compared with a threshold value considered to be a safe margin to maintain voltage stability for the given node, and based on that comparison, the given node is identified as weak or strong.

2. The method according to claim 1, wherein the nodal coefficient of voltage stability /$k_{cr}$/ is calculated from this relation:

$$k_{cr} = \frac{\sqrt{(p_{cr} - p_b)^2 + (q_{cr} - q_b)^2}}{\sqrt{(q_{cr})^2 + (q_{cr})^2}},$$

where: $p_{cr}$—represents values of active load coordinates in a node during critical operating conditions at voltage stability limits, $q_{cr}$—represents values of reactive load coordinates in a node during critical operating conditions at voltage stability limits, $P_b$—represents values of the coordinates of the base load point of active load in a node, and $q_b$—represents values of the coordinates of the base load point of reactive load in a node.

3. The method according to claim 1, wherein the given node is considered weak where the value of the nodal coefficient /$k_{cr}$/ is less than or equal to 0.8 or it is considered strong when the value of the nodal coefficient /$k_{cr}$/ is more than 0.8.

* * * * *